Aug. 11, 1970  S. C. RETHORST  3,523,661
VERTICALLY ASYMMETRIC DIFFUSER SYSTEM FOR
REDUCING AIRCRAFT INDUCED DRAG
Filed Feb. 19, 1968  2 Sheets-Sheet 1
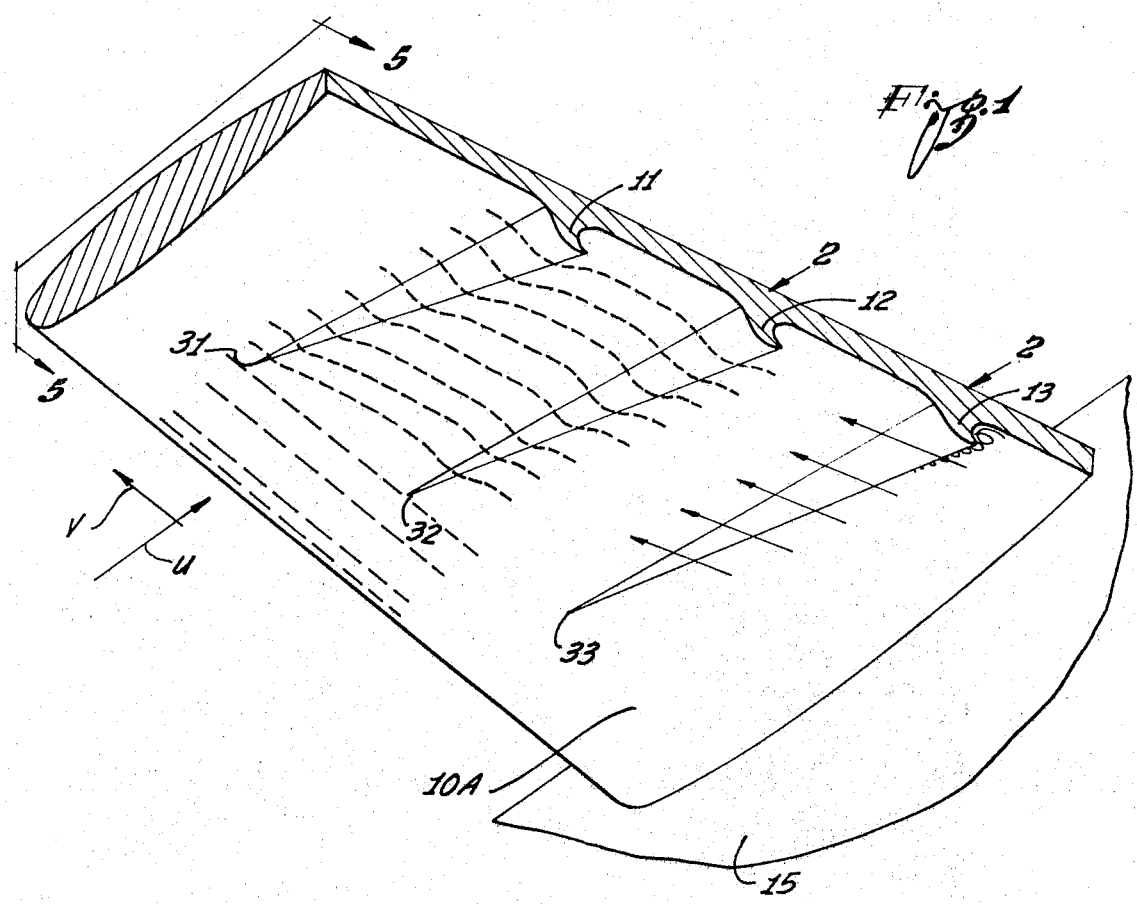
Fig.1
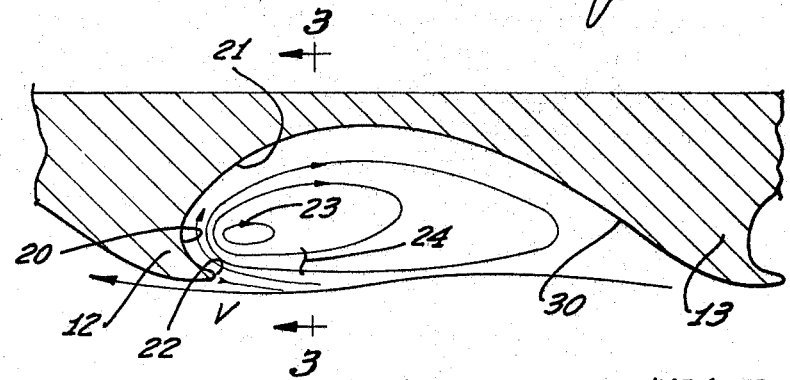
Fig.3
Fig.2
INVENTOR:
Scott C. Rethorst
By Smyth, Roston & Smith
ATTORNEYS

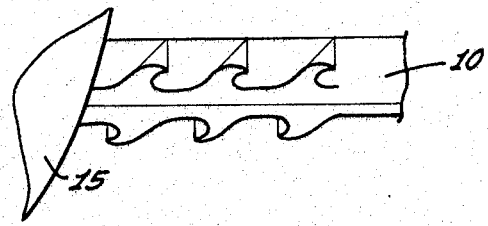
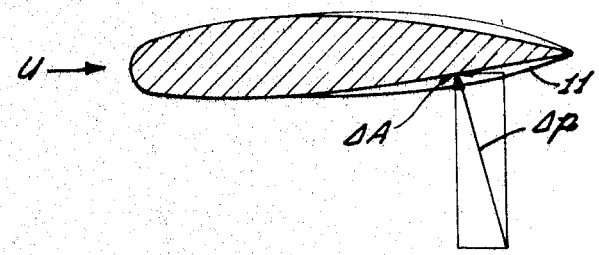
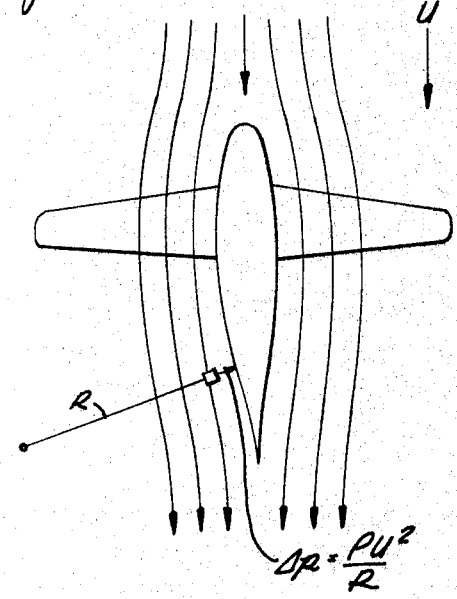
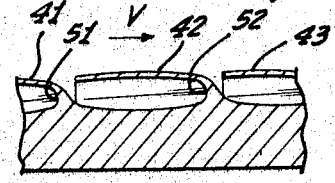
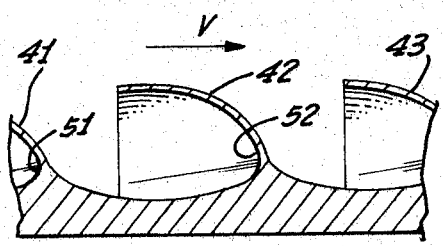

3,523,661
Patented Aug. 11, 1970

3,523,661
VERTICALLY ASYMMETRIC DIFFUSER SYSTEM FOR REDUCING AIRCRAFT INDUCED DRAG
Scott C. Rethorst, 1661 Lombardy Road,
Pasadena, Calif. 91106
Filed Feb. 19, 1968, Ser. No. 706,480
Int. Cl. B64c 23/06
U.S. Cl. 244—41  10 Claims

ABSTRACT OF THE DISCLOSURE

Structure for reducing aircraft induced drag and increasing lift is disclosed wherein ribs are provided on one or both surfaces of a wing, each rib being formed with a concave cavity on one side to face the spanwise flow over the respective wing surface. The cavity increases in cross section towards the aft end of the wing to form diffusers. Preferably the vertical cross section of the cavity is asymmetrical. The diffusers are aligned with respect to the flow so as to generate a vortex flow on the underside of the wing providing positive pressure or lift as well as thrust, and a turned flow on the upper side of the wing providing, in one region, reduced pressure or suction lift, and in another region, positive pressure or thrust.

---

This application pertains to improvements in the vortex generating and diffusing system disclosed in my application Ser. No. 425,381, filed Jan. 11, 1965, now U.S. Letters Pat. 3,369,775.

My prior invention of Ser. No. 425,381 disclosed a vortex generation and diffusion system comprising a series of vortex diffusers defined by ribs or ridges asymmetric in spanwise cross section on the surface of the wing, and disposed so as to utilize the spanwise flow over a finite span wing to generate and diffuse the normal trailing vorticity within the wing planform into pressure on the backside of the wing.

The improvement of the present invention over that of Ser. No. 425,381 consists of a particular shape and arrangement of the vortex diffusion structure, comprising a ridge shaped to provide a diffuser concave to the spanwise flow to generate a vortex flow on the underside of the wing providing positive pressure or lift as well as thrust, and further providing a turned flow on the upper side of the wing thereby providing, in one region, reduced pressure and suction lift, and in another region, positive pressure and thrust.

On the underside of the wing the vertical cross section of the diffuser concavity is preferably asymmetrical to facilitate formation of an asymmetric vortex having its center displaced towards the outer part of the ridge, so that the flow in the vortex is diffused in flowing inward towards the surface of the wing. This system thereby provides not onyl chordwise diffusion but rotational diffusion, or diffusion within the vortex itself. This structure thus provides an asymmetric vortex, or rather a vortex which is asymmetric in cross section, and which is so disposed that the pressure developed on the wing surface itself is higher than that of the outer flow beyond the boundary layer. The diffuser is aligned at an angle to the resultant stream in its forward region, so as to generate the vortex flow, but in its aft region is curved in the resultant stream direction so as to minimize any turning of the stream and maximize the vortex flow and its diffusion into positive pressure on the wing surface, providing both lift and thrust, and also increasing the favorable pressure gradient in the boundary layer, thereby minimizing any separation drag.

On the upper side of the wing the diffuser is similarly aligned at an angle to the resultant flow in its forward region, so as to capture the spanwise flow, and in its aft region continues at an angle to the resultant flow, so as to turn the spanwise flow in the axial direction, thereby producing a thrust as the reaction to this change in momentum. The diffuser alignment is thus adjusted to maximize turning of the flow and minimize the vortex flow, thereby retaining a reduced pressure and suction lift on the upper surface of the wing itself. Furthermore, the diffuser on the upper surface of the wing is configured in a more extensive manner in the spanwise direction, so that the upper portion of the diffuser is actually comprised of a sheet or membrane extending in a cantilever manner against the spanwise flow. This sheet or membrane is disposed at an angle of attack with respect to the spanwise flow, acting as a small wing or winglet. This winglet would also normally be provided with a modest amount of camber.

Part of the spanwise flow would then curve over the upper surface of the winglet in a convex manner, with the centrifugal force providing a reduced pressure or suction on the upper surface of the winglet as in a conventional wing. Similarly, part of the spanwise flow would curve under the lower side of the winglet in a concave manner, with the centrifugal force producing a pressure on the under surface of the winglet, as in a conventional wing. The winglet then transmits through bending a lift force to the wing from the integrated suction on its upper surface and pressure on its lower surface.

The flow along the undersurface of the winglet then continues down into the vortex cup or diffuser, which, because of its chordwise divergence or angle to the resulting flow, turns the flow in the chordwise direction, thereby producing thrust as the flow continues on aft to the trailing edge of the wing.

The subboundary layer on the wing surface flowing down into the vortex cup would be of reduced energy or total head as a result of its frictional rubbing along the wing surface, and thus be of a semi-stagnant form with a relatively higher pressure and deficiency in axial velocity because of the frictional energy dissipation.

The outer spanwise flow along the underside of the winglet in curving down into the vortex cup would then energize this stagnant subboundary layer, increasing its axial velocity, thus overcoming the axial wake deficiency that would otherwise be present. Furthermore, increasing the axial velocity of this flow reduces its pressure on the wing surface at the bottom of the diffuser, thereby providing additional lift on the wing surface itself. In addition, energizing of this boundary layer enables it to better proceed against the adverse pressure gradient in the boundary layer, thereby minimizing separation drag.

Thus, air from the outer flow moving in the spanwise direction is continually brought downward into this winglet system, and a new mass of air at each winglet disappears down the underside of the diverging vortex diffuser and is turned into axial flow, producing (1) increased pressure on the underside of the winglet, thus adding to the lift, (2) a thrust due to the change in momentum or turn into the axial direction, and (3) an energizing of the stagnant subboundary layer, increasing the lift on the wing itself.

A conventional wing develops a circulation in the chordwise direction which may be regarded as a higher velocity on its upper surface and a lower velocity on its lower surface as compared to the undisturbed free stream. With a wing having a smooth surface, and in the absence of any structure thereon to cause deviations or separated flow from this surface, the pressure developed as a result of this chordwise velocity asymmetry is continuous and regular right down to the wing surface itself. The velocity of the air is, of course, stopped on the wing surface because of viscosity, but the velocity in the boundary layer rapidly approaches that of the free stream, and in conventional wing theory, in the absence of any such modifying structure as described, the pressure is found to be continuous from the outer flow into the boundary layer and onto the surface of the wing itself.

The vertically asymmetric diffusers of the present invention provide an intentional departure from this conventional state of affairs, and are directed precisely towards development of a positive pressure on the under surface of the wing which exceeds that of the outer flow and a reduced pressure on the upper surface of the wing, say as compared to the edge of the boundary layer. This is a unique and significant departure from conventional wing theory, and is a mechanism provided precisely for the purpose of utilizing and recovering the energy of the spanwise flow into more favorable pressures on the surface of the wing. The vertically asymmetric vortex diffusers are disposed on the wing surfaces so that the modifications in pressure on the surfaces of the wing are provided primarily on the backside of the wing, thereby providing an increased lift, thrust, or reduced drag in the direction of flight.

A further improvement of the present invention is to arrange the diffusers on the wing in such a way as to incline the flow inboard over both the upper and lower surfaces of the wing, and to use the sides of the fuselage to thereafter deflect this inward flow aft, wherein the increased pressure of this spanwise flow against the aft end of the fuselage provides a thrust component, thereby accomplishing a further recovery of the energy in the spanwise flow.

The foregoing and other readily apparent features of my present invention will be better understood by reference to the following more detailed specification and accompanying drawings, in which:

FIG. 1 is a perspective view of the preferred embodiment of the forward part of an aircraft wing system, including vertically asymmetric spanwise flow diffusers or vortex diffusers on the under surface of the wing, and showing the vortex diffusers concave to the windward side and expanding in cross section in the aft chordwise direction;

FIG. 2 is an enlarged sectional view taken along the line 2—2 of FIG. 1, illustrating the development of the vortex within the concave cup facing the spanwise flow;

FIG. 3 is a flow profile taken along the line 3—3 in FIG. 2 but slightly enlarged;

FIG. 4 is an aft view of a wing showing a rib system on both surfaces;

FIG. 5 is a cross sectional view of the wing of FIG. 1 taken along the line 5—5 thereof and illustrating how the increased pressure developed on the backside of the wing has a component in the flight direction providing thrust for an equivalent reduction in drag;

FIG. 6 is a plan view of an aircraft incorporating the wing system described, illustrating the use of the spanwise vortex diffusers primarily on the lower surface of said wing, wherein the flow from both the upper and lower surfaces of the wing is inclined inboard, providing a flow at a small angle against the aft end of the fuselage, which in turning the flow aft develops an increased pressure thereon having a thrust component; and FIGS. 7a and 7b show a cross sectional view through a wing to illustrate the embodiment of the present invention on the upper wing surface.

Proceeding now to the detailed description of the drawings. In FIG. 1 thereof, a lower surface 10A of the forward part of an aircraft wing 10 as attached to a fuselage 15, is provided with ridges or ribs such as 11, 12 and 13. The ribs extend essentially in the direction of the mean flow U of air over wing surface 10A, and they increase in height from that surface towards the rear of the wing. More ribs can be provided if necessary depending, for example, upon wing span and other configuration and construction features which are variable from wing to wing. The induced drag to be reduced differs from wing type to wing type which, in turn, requires differences in the dimensions of the drag reducing structure. Nevertheless, the principle for drag reduction and as suggested here remains the same, so that a description of a single rib structure suffices.

Each rib, for example rib 11, has a concave surface portion 20 on one of its sides and a faired surface 30 on the other side. Any cross section through a rib and taken in any vertical, spanwise extending plane will show a contour similar to those visible in FIG. 1 and as shown in an enlarged view in FIG. 2. A rib's surface can be considered as being formed by diverging lines, essentially straight lines originating on the wing surface, such as points 31, 32, 33, where the ribs themselves originate, except that near the origin of a rib everything merges smoothly into the wing surface. If such a section plane is more to the front of the wing, the dimensions of the ribs are smaller, but the contour is essentially the same. Thus, as a consequence of the configuration chosen, the concave wall 20 of a rib increases in size along the rib towards the rear thereof, thus establishing a diffuser. As a further improvement of the structure, concave wall 20 has a radius of curvature, again taken in a vertical spanwise plane, which decreases with distance from the wing surface 10A. Thus, surface portion 21 of the cavity defining surface 20, located rather close to the surface 10 of the wing, actually merges smoothly into surface 10A, and has a larger radius of curvature than the radius of curvature of surface portion 22 located near the top of the rib. This results in an asymmetrical surface profile of the concave side of the rib in any vertical spanwise plane.

The drag inducing flow component has outboard direction on the lower surface of the wing, and the ribs are mounted thereon so that the respective concave surfaces of the ribs face that outboard component, denoted by arrow V in FIGS. 1 and 2. The outboard component is in part intercepted by the concave surfaces of the several ribs and redirected to form vortices as depicted by means of flow lines in FIG. 2. The concave surfaces then change the outboard flow along the surface of the wing by operation of essentially two features, both produced by the ribs.

The first aspect is derived from the diffuser configuration of any of the concave surfaces of the ribs. The cross section of the concave surface of a rib through the area effective as a diffuser increases from the origin of the rib toward the rear of the wing. Of course, the airflow "trapped" by the concave surface has a substantial flow component U from front to rear of the wing along the ribs. The result is a spiralling flow path as depicted in FIG. 1 for rib 13. The vortices formed along the concave walls near the ribs' origins thus increase in diameter along the diffuser. For reasons of conservation of angular momentum, the vortex velocity decreases in the chordwise direction. As a consequence, the vortices are diffused towards the rear of the wing. Moreover, the vortex cores increase in size and they become increasingly interposed between the spanwise flow "sheet" forming the outboard component, and the wing surface proper, thereby lifting that flow sheet off the wings' surfaces. The smooth contour of the concave ribs' surface ensures generation of a rearwardly expanding diffused vortex rather than generation of induced turbulence. The plurality of diffused vortices trailing off the wing are also interposed between the inboard flow as it trails off the top surface in the rear of the wing, and the outboard flow likewise trailing off the rear of the underside of the wing; thus, the trailing off flow components merge without providing singularities or a sudden difference in their spanwise velocity components.

The second aspect of the diffuser structure is the asymmetry of the contour of the concave surface 20 of any of the ribs, and in a plane extending vertical as well as spanwise to the wing. As a consequence, the center 23 of the vortex formed in the concave surface becomes displaced and is closer to the top of the rib than to the surface 10A; in other words, the center of the vortex is above the semi-height of the rib. Following the flow pattern (FIG. 2) one can thus see that there is also spanwise diffusion of flow in region 24. The cross sectional area encountered by the flow and the asymmetric vortex increases as the flow proceeds from the high velocity region between the vortex core and the surface portion 22 down towards surface portion 21 and wing surface 10A. The velocity decreases along that flow path because of the continuity principle with a corresponding increase in pressure in accordance with Bernoulli's equation. Thus, a double diffuser effect is provided. The rearwardly increasing cross section area made available by the concave rib surfaces forces expansion of the vortex with a resulting angular velocity decrease. The asymmetric contour of the concave surface distorts the vortex to produce divergent flow towards and in the vicinity of the wing surface, the flow being essentially opposite to the drag inducing component.

As a consequence of the foregoing velocity reduction, the pressure along the surface of the wing increases in rearward direction. Added to that is the dynamic pressure resulting from the fact that the spanwise flow is reacted into the wing, reducing the vortex strength along the rib. The total resulting pressure component dynamically produced by the diffusers acts normal to the surface of the wing and is the equivalent of a thrust producing component due to the inclination of that surface to the direction of flight. The thrust tends to offset the rearwardly directed frictional drag in the balance of forces. FIG. 5 illustrates how the pressure component $\Delta P$ acts upon the wing's surface and does, in fact produce a thrust which eliminates, to some extent or completely, the drag as it would otherwise result from the spanwise flow across the surface of the wing.

Ribs of this type can also be mounted to the upper surface of the wing, or, in the alternative, they may be mounted only to the upper surface of the wing. As the drag inducing spanwise flow is inboard on the upper side of the wing, the ribs must be positioned so that the respective concave sides face away from the fuselage, as is schematically shown in FIG. 4.

It should be noted that drag is induced as a result of oppositely directed spanwise components above and below the wing producing a spanwise velocity discontinuity or a singularity aft of the wing. Vortex diffusion on the wing's surface on top or on the bottom thereof eliminates this singularity so that the resulting free flow aft of the wing remains essentially vortex free, while the vortices produced on the wing's surface are essentially reacted into the wing itself. In view of the diffuser action, the vortex energy is essentially recovered into pressure at the trailing edge of each diffuser. Thus, vortex diffusion can be produced on either or both wing surfaces.

The ribs can be made to have a main orientation towards the fuselage on the underside of the wing. The number and dimensions of the ribs can be selected so that the main flow trailing off of the rear edge of the wing from both upper and lower wing surfaces has inboard components, thus directing the main flow towards the fuselage, but, of course, at a small angle. This is illustrated schematically in FIG. 6, wherein the fuselage 15 is concavely shaped (radius R) to turn that flow which thus develops an increased pressure $\Delta P$, as a result of or as pressure equivalent of the centrifugal force. This pressure $\Delta P$ is in turn effective as a thrust producing component acting on the fuselage accordingly. For obtaining this additional thrust, it may suffice to maintain the inboard component on the upper side of the wing essentially undisturbed, and to cause the ribs on the under surface of the wing to convert the outboard flow into an inboard flow.

In FIGS. 7a and 7b is illustrated the modified diffusers for the upper surface of the wing. This takes into consideration that in a nonclimbing, fast flying aircraft, the spanwise drag inducing flow is rather small, whereas in slow flight and/or during climbing the spanwise flow is rather strong. Hence, the diffusers are needed only in the latter case, not or only very little in the former case. The diffusers are formed of smoothly concave, triangularly-shaped hinged sheets such as 41, 42, 43, etc. They are folded down respectively along hinge axes 51, 52, 53, etc., which is the normal position, as shown in FIG. 7a. This position is maintained whenever the cross flow V is rather small. The sheets, however, do not fold down completely so that there is a chordwise extending gap. The hinge axis is somewhat oblique to that direction, so that the triangle sheets have a point analogous to origin 31, etc., of the diffusers shown in FIG. 1. As the cross flow V increases for any reason, the sheets will be forced up into a position as shown in FIG. 7b. The hinge permitting this folding down may be a particularly elastic portion of the sheets as attached to wing 10, or the elasticity of the sheets as so attached may suffice to normally urge the sheets into the folded down position (FIG. 7a) leaving a narrow gap. A strong cross flow V, when captured, folds the sheets up. The dynamic pressure balances the resilient reaction and the equilibrium determines the position of the sheets. Diffuser operation is then as aforedescribed. It is, of course, possible to make the sheets relatively rigid, to use regular hinges, and to employ remote control mechanisms for folding the sheets up or down. Folded diffusers can be provided additionally, or in alternative, or the underside of the wing.

The sheets 41, 42, 43, etc., may be regarded as small wings or winglets, which, as seen in FIGS. 7a and 7b, are extended essentially horizontal, yet at an angle of attack, against the spanwise velocity V. These winglets are seen to have upper and lower surfaces.

The spanwise velocity will then fork in approaching the leading edge of each winglet, with the upper portion of the stream going over the upper convex side of the winglet producing suction lift, and the lower portion of the stream going under the lower concave side of the winglet producing pressure lift.

The boundary layer, namely, the air flowing immediately adjacent to the wing surface 10, will then flow down along the bottom part of the diffuser, where the loss in energy or total head due to the frictional rubbing of this boundary layer along the wing surface results in this air at the bottom of the diffuser being of a lower chordwise velocity and in stagnant form.

The sheets 41, 42, 43, etc., forming the diffuser are, respectively, shaped with minimum radius of curvature along their sides, where the higher centrifugal force and corresponding higher pressure in conjunction with the diverging diffuser wall acts in the thrust direction, thereby changing the momentum from spanwise to axial direction. This elimination of the spanwise momentum impedes significantly the flow from continuing around the diffuser across the wing surface at the bottom of the diffuser. A pressure rise on the wing surface itself at the bottom of the diffuser is thus avoided, and instead the chordwise drag inducing flow is directed to flow in an axial direction to proceed aft and energize and increase the velocity of the stagnant boundary layer at the bottom of the diffusers, thereby increasing the lift on the wing itself, which as stated, has its maximum radius of curvature, as far as its participation in the diffuser formation is concerned, along the diffuser bottom where the now reduced pressure acts in the lift direction. Furthermore, energizing of the otherwise stagnant boundary layer enables this boundary layer to more readily proceed against the adverse pressure gradient in the boundary layer, thereby minimizing separation drag.

The invention is not limited to the embodiments described above but all changes and modifications thereof

What is claimed is:

1. A vortex diffuser on the surface of a finite span wing of an aircraft, said diffuser having a concave opening in vertical cross section and facing in the direction of the spanwise flow, said concave opening having a radius of curvature increasing towards the surface of the wing in the vicinity thereof.

2. A vortex diffuser as set forth in claim 1, said concave opening being further asymmetric in vertical cross section, said asymmetry comprising a minimum radius of curvature above the semi-height of said diffuser.

3. A vortex diffuser as set forth in claim 1, said concave opening having nonuniform radius of curvature in a direction along the diffuser surface and in direction of wing movement with a minimum radius at the side of the diffuser.

4. A vortex diffuser mounted upon the surface of a finite span wing of an aircraft, said diffuser having a concave opening facing in the direction of the undisturbed spanwise flow, said concave opening being asymmetric in vertical cross section, said asymmetry comprising a radius of curvature increasing towards the surface of the wing.

5. An aircraft wing for finite outboard extension from a fuselage and having upper and lower surfaces, there being a plurality of ridges on at least one of said upper and lower surfaces oriented to run essentially in the direction of the main flow, increasing in height in that direction, and having concave surface portions facing spanwise flow towards and over said ridges, the concave surface portions having nonuniform radius of curvature in vertical spanwise cross section to generate a series of asymmetric vortices adjacent thereto and within the plan form of at least said one surface.

6. A vortex diffuser mounted upon the surface of a finite span wing of an aircraft effective in chordwise direction and having means defining a concave opening facing in the direction of the spanwise flow and at an aperture cross section having dimensions variable in dependence upon the intensity of the spanwise flow.

7. A vortex diffuser as set forth in claim 6, the defining means being normally folded down sheets hinged to the wing surface and erectable under the influence of the spanwise flow to define the diffusers.

8. A vortex diffuser on the surface of a finite span wing defined by a ridge-type element remote from the wing tip and extending in chordwise direction and having at least a portion concave in a plane which includes spanwise flow direction and normal to the surface of the wing, the concave portion facing the spanwise flow.

9. A vortex diffuser as set forth in claim 8, the element being mounted for folding down towards the surface, there being means for providing controlled variations in the aperture as defined by the element and facing the spanwise flow.

10. A diffuser as set forth in claim 9, the means comprising resilient mounting means for reacting against the spanwise flow when acting against the element tending to fold the element down.

References Cited

UNITED STATES PATENTS

| | | | |
|---|---|---|---|
| 2,576,981 | 12/1951 | Vogt | 244—91 |
| 1,303,544 | 5/1919 | Dorr | 244—41 |
| 3,124,200 | 3/1964 | Wilson | 170—135 |
| 2,740,596 | 4/1956 | Lee | 244—40 |
| 868,038 | 10/1907 | De Uherkocz | 244—22 |
| 181,186 | 8/1876 | Lamboley | 244—22 |
| 3,270,988 | 9/1966 | Cone | 244—35 |

MILTON BUCHLER, Primary Examiner

J. L. FORMAN, Assistant Examiner